US012583545B2

(12) United States Patent
Schlayer

(10) Patent No.: US 12,583,545 B2
(45) Date of Patent: Mar. 24, 2026

(54) REAR MIRROR ASSEMBLY WITH ANTI-ROTATION PROTECTION

(71) Applicant: Bayerische Motoren Werke Aktiengesellschaft, Munich (DE)

(72) Inventor: Andreas Schlayer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 3 days.

(21) Appl. No.: 18/015,648

(22) PCT Filed: Jul. 9, 2021

(86) PCT No.: PCT/EP2021/069128
§ 371 (c)(1),
(2) Date: Jan. 11, 2023

(87) PCT Pub. No.: WO2022/048816
PCT Pub. Date: Mar. 10, 2022

(65) Prior Publication Data
US 2023/0249774 A1 Aug. 10, 2023

(30) Foreign Application Priority Data
Sep. 7, 2020 (DE) ..................... 10 2020 123 262.4

(51) Int. Cl.
*B62J 29/00* (2006.01)
*B60R 1/04* (2006.01)
*B62J 45/00* (2020.01)

(52) U.S. Cl.
CPC ................. *B62J 29/00* (2013.01); *B60R 1/04* (2013.01); *B62J 45/00* (2020.02)

(58) Field of Classification Search
CPC .... B60R 1/04; B60R 1/06; B62J 29/00; B62J 45/00
(Continued)

(56) References Cited

U.S. PATENT DOCUMENTS 2,600,893 A 6/1952 Mariani
5,755,526 A 5/1998 Stanevich
(Continued)

FOREIGN PATENT DOCUMENTS

CN 105383391 A 3/2016
DE 195 21 432 A1 12/1996
(Continued)

OTHER PUBLICATIONS

German-language Search Report issued in German Application No. 10 2020 123 262.4 dated Jan. 31, 2023 with partial English translation (10 pages).
(Continued)

*Primary Examiner* — Todd M Epps
(74) *Attorney, Agent, or Firm* — Crowell & Moring LLP

(57) ABSTRACT

A rear mirror assembly for a motorcycle includes a mirror mounting and a holding arm which is configured to connect the mirror mounting to the motorcycle. An adjustment device is arranged between the holding arm and the mirror mounting. The adjustment device is configured to be rotatable at least about one free rotational axis in order to adjust the position of the mirror mounting relative to the holding arm. The adjustment device includes a limiting device in order to limit the rotational adjustment.

12 Claims, 3 Drawing Sheets

(58) Field of Classification Search
USPC .......................... 248/483; 359/872, 838, 877
See application file for complete search history.

(56) References Cited

U.S. PATENT DOCUMENTS

| | | | |
|---|---|---|---|
| 5,867,328 | A | 2/1999 | Stapp et al. |
| 6,036,160 | A * | 3/2000 | Shimokobe ............. B62J 29/00 |
| | | | 248/549 |
| 6,848,816 | B2 * | 2/2005 | Gilbert ................. B60Q 1/2665 |
| | | | 362/494 |
| 6,877,709 | B2 * | 4/2005 | March .................... F16C 11/06 |
| | | | 248/549 |
| 7,048,420 | B2 * | 5/2006 | Arakawa ............. B60Q 1/2665 |
| | | | 362/540 |
| 7,172,298 | B2 * | 2/2007 | Olijnyk .................. B60R 1/074 |
| | | | 359/877 |
| 7,585,081 | B2 * | 9/2009 | Vanderslik ............. B60R 1/078 |
| | | | 359/842 |
| 8,210,695 | B2 * | 7/2012 | Roth ......................... B60R 1/12 |
| | | | 359/872 |
| 8,220,866 | B1 * | 7/2012 | Hart ....................... B62D 25/04 |
| | | | 296/193.09 |
| 9,994,155 | B2 * | 6/2018 | Nishimoto ............... B60R 1/06 |
| 10,989,896 | B2 * | 4/2021 | Erbe .................... G02B 7/1822 |
| 2003/0142422 | A1 * | 7/2003 | Spitzer .................... B62J 29/00 |
| | | | 359/842 |
| 2010/0033857 | A1 * | 2/2010 | Filipiak .................... B60R 1/04 |
| | | | 359/872 |
| 2017/0253184 | A1 | 9/2017 | Nishimoto et al. |
| 2018/0148116 | A1 | 5/2018 | Kurata |
| 2018/0215429 | A1 | 8/2018 | Thorpe et al. |
| 2020/0406831 | A1 | 12/2020 | Michel et al. |

FOREIGN PATENT DOCUMENTS

| | | | | |
|---|---|---|---|---|
| DE | 19752185 | A1 * | 6/1998 | ............. B62J 29/00 |
| DE | 20 2011 003 950 | U1 | 6/2012 | |
| DE | 10 2017 126 294 | A1 | 5/2019 | |
| DE | 10 2019 209 556 | A1 | 12/2020 | |
| IT | MI20120585 | A1 | 10/2013 | |
| KR | 10-1788979 | B1 | 10/2017 | |

OTHER PUBLICATIONS

International Search Report (PCT/ISA/210) issued in PCT Application No. PCT/EP2021/069128 dated Oct. 5, 2021 with English translation (seven (7) pages).
German-language Written Opinion (PCT/ISA/237) issued in PCT Application No. PCT/EP2021/069128 dated Oct. 5, 2021 (five (5) pages).
English translation of Chinese-language Office Action issued in Chinese Application No. 202180061351.1 dated Jun. 13, 2025 (8 pages).

* cited by examiner

REAR MIRROR ASSEMBLY WITH ANTI-ROTATION PROTECTION

BACKGROUND AND SUMMARY OF THE INVENTION

The invention relates to a rear mirror assembly and to a correspondingly equipped motorcycle.

Motorcycles, such as motorbikes or motor scooters, generally comprise one or two rear mirrors to allow the driver to observe a region behind the driver while driving. In this case, a mirror is held in a housing, which in turn is fixed to the structure of the vehicle by way of a holding arm. Usually, the mirror is rigidly connected to the housing so that the mirror is adjustable by way of an articulated connection to the holding arm.

With the growing integration of driver assist systems and convenience functions, electrical components such as lighting elements, indicators or mirror heaters also increasingly find their way into the mirror housing of motorcycles and are controlled by way of electrical lines which are guided inside the holding arm from the vehicle structure into the mirror housing. Conventionally, the electrical lines are additionally guided through an interior of the articulation of the articulated connection.

In rear mirrors which are "electrified" in this manner, the possibility that, by adjusting the mirror or the housing multiple times over the lifespan of the vehicle, the electrical lines will be twisted and thus damaged, or electrical contact will thereby be released, cannot be ruled out.

It is an object of the invention to develop a rear mirror assembly in an advantageous manner, in particular to reduce the risk of damage to electrical lines integrated in the rear mirror assembly.

This object is achieved by a rear mirror assembly and by a motorcycle according to the claimed invention.

Accordingly, a rear mirror assembly for a motorcycle is provided, comprising a mirror mounting and a holding arm which is designed to connect the mirror mounting to the motorcycle, an adjustment device being arranged between the holding arm and the mirror mounting, the adjustment device being designed to be rotatable about a free axis of rotation in order to adjust the position of the mirror mounting relative to the holding arm by way of a rotational adjustment (also referred to as a rotational movement). In addition, the adjustment device comprises a limiting device for limiting the rotational adjustment.

The rear mirror assembly thus comprises a mirror mounting, which can be for example in the form of a mirror housing. The housing can be for example shell shaped and, in the region of a cavity formed by the shell shape, can receive a mirror element (for example a mirror glass).

In each case, the mirror mounting is connected to a vehicle-remote, first end of the holding arm by way of the adjustment device. A second end close to the vehicle, which is arranged opposite the first end, can be designed to be connectable to a vehicle structure of the motorcycle or (when installed on the motorcycle) connected thereto. The vehicle structure can comprise inter alia handlebars, a vehicle frame and/or a vehicle trim or a vehicle body. The connection of the second end of the holding arm to the vehicle structure can be rigid or also articulated.

The adjustment device is designed to make the mirror mounting adjustable relative to the holding arm. For this purpose, the adjustment device is rotatable at least about the free axis of rotation. It is understood that the adjustment device can also have other, additional degrees of freedom.

Moreover, the adjustment device comprises the limiting device which is provided to limit a range of motion of the rotational adjustment about the free axis of rotation. The limiting device is thus designed to limit or block a rotation of the mirror mounting relative to the holding arm beyond a defined range of motion. The limiting device is thus anti-rotation protection which prevents excessive rotation of the mirror housing relative to the holding arm. This reduces wear of the movable parts and points of connection which are subject to friction effects so that particularly high longevity of the adjustment device can thus be ensured.

In addition to the non-electrified rear mirror assemblies, this configuration of the rear mirror assembly is therefore particularly suitable for electrified rear mirror assemblies which have one or more electrical lines which extend between the holding arm and the mirror mounting. The electrical lines can be guided inside the holding arm from a vehicle structure into the mirror mounting, the electrical lines being able to be guided through the adjustment device.

By way of example, the rear mirror assembly can comprise electrical components, such as lighting elements, indicators and/or heating elements, which are assigned to the mirror housing and/or the mirror glass and are powered and/or supplied with electrical signals by way of the electrical lines.

In the case of an electrified rear mirror assembly, the limiting device effectively prevents overwinding or twisting of the electrical line(s) located inside and thus damage thereto, for example as a result of broken wires or an electrical contact being released. Thus, particularly high longevity can also be provided with regard to the electrical connection.

In the context of this description, motorcycle is understood to mean inter alia motorbikes or motorbike-like motor vehicles, such as motor scooters, in particular tiltable two, three or four-wheeled motor scooters or the like, and snowmobiles or quad bikes.

According to one preferred embodiment, the adjustment device comprises a ball joint having a ball socket and a ball head guided in the ball socket. The ball joint makes it possible to easily adjust the mirror mounting in the position thereof relative to the holding arm, rotation about the free axis of rotation formed by the ball joint being made possible.

For this purpose, the ball head can preferably be assigned to the mirror mounting, and the ball socket assigned to the holding arm. Alternatively, a reversed assignment is also possible.

Furthermore, the ball head can be formed by a housing wall of the mirror mounting. The ball head is thus an integral component of a mirror housing of the mirror mounting. For example, the housing wall of the mirror mounting can be produced by way of injection molding or die casting, and in the process, the ball head can be produced as a single piece with and/or from the same material as the housing wall.

According to one embodiment, the limiting device can be arranged on a side of the housing wall of the mirror mounting which faces away from the ball socket.

In addition, the limiting device can comprise a blocking element having at least one extension which is provided to act on at least one stop of the limiting device in at least one end position of the rotational adjustment. In this case, the at least one stop can be assigned for example to the mirror mounting or the housing wall thereof. By contrast, the blocking element can be coupled in a rotationally fixed manner to the ball socket so that a rotational movement of the mirror mounting leads to a rotation of the housing wall and thus of the one or more stops relative to the blocking element. If the at least one stop reaches the corresponding extension of the blocking element, then any additional rotational movement going further in this direction of rotation is blocked. The at least one stop thus limits freedom of movement to such an extent that the mirror mounting can be rotated only by a predetermined angle. In this way, over-winding of any electrical lines that may be located inside is prevented.

Of course, analogously with the same effect, the at least one stop can be assigned to the blocking element, and the at least one extension can be assigned to the housing wall of the mirror mounting.

Preferably, the blocking element can be arranged on a first side of the housing wall, and the ball socket can be arranged on a second side which is arranged opposite the first side. The housing wall is thus positioned between the ball socket and the blocking element.

In order to arrange the blocking element in a rotationally fixed manner with respect to the ball socket, the socket can be connected by a connector, for example by a screw, or by way of a common assembly, to an end portion of the holding arm (in the region of the first end). For this purpose, the connector or the end portion can extend through a correspondingly dimensioned recess in the ball head. When adjusting the mirror mounting, the housing wall can still be moved together with the ball head relative to the ball socket and the blocking element.

Furthermore, the adjustment device can comprise a spring element for axially preloading the adjustment device, the spring element preloading the blocking element with a spring tension toward the ball head and the ball socket. For example, the spring element can be arranged in such a way that the clamping force is oriented in a direction coaxial with the connector, with the end portion of the holding arm and/or with the free axis of rotation. For example, the spring element can be in the form of a helical spring and can be arranged coaxially with the connector, with the end portion and/or with the free axis of rotation.

Furthermore, the adjustment device (in addition to the rotational adjustment about the free axis of rotation) can be designed to tilt the mirror mounting relative to the holding arm.

As described above, the rear mirror assembly can comprise at least one electrical line which extends from the holding arm through the adjustment device to the mirror mounting. For this purpose, the holding arm can comprise a continuous cavity along the length thereof for wire routing.

Furthermore, a motorcycle comprising at least one rear mirror assembly is provided which is connected to a vehicle structure of the motorcycle, the rear mirror assembly being designed according to the description.

The invention will be explained in greater detail below on the basis of an exemplary embodiment, with reference to the drawings.

DETAILED DESCRIPTION OF THE DRAWINGS

Figure 1:
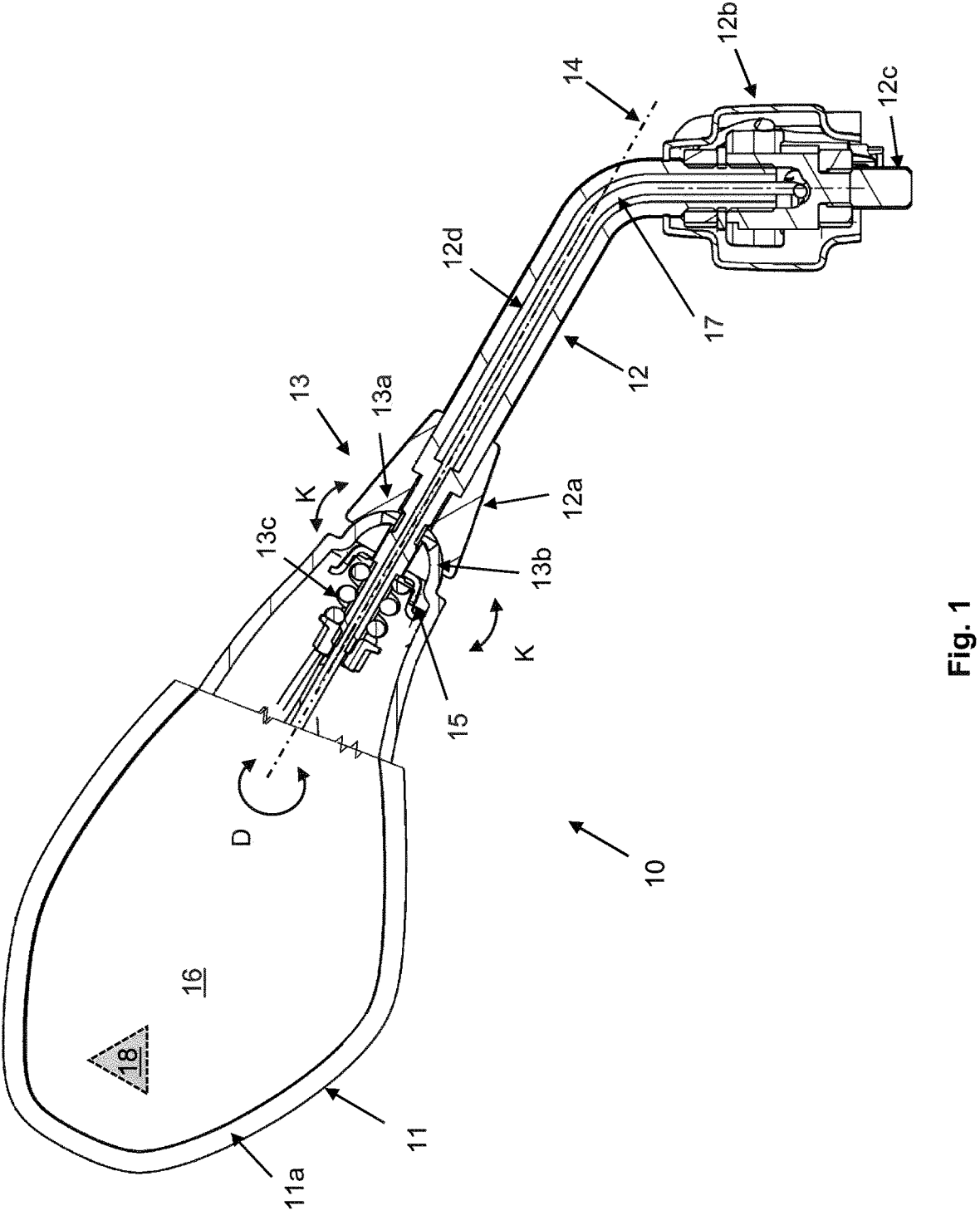
FIG. 1 shows a rear mirror assembly according to the description.

FIG. 1 shows a rear mirror assembly 10 for a motorcycle (not shown) in a partially cutaway side view. The rear mirror assembly 10 comprises a mirror mounting 11 and a holding arm 12 which is designed to connect the mirror mounting 11 to the motorcycle, an adjustment device 13 being arranged between the holding arm 12 and the mirror mounting 11, the adjustment device being designed to be rotatable at least about one free axis of rotation 14 (rotational adjustment D) in order to adjust the position of the mirror mounting 11 relative to the holding arm 12. In addition, the adjustment device 13 comprises a limiting device 15 for limiting the rotational adjustment D.

In the embodiment shown, the mirror mounting 11 is in the form of a shell-shaped mirror housing. The shell shape forms a cavity in which a mirror element 16 is arranged and which is surrounded by a peripheral edge portion 11a of the mirror mounting 11.

The mirror mounting 11 is connected to a vehicle-remote, first end 12a of the holding arm 12 by way of the adjustment device 13. A second end 12b close to the vehicle, which is arranged opposite the first end 12a, is designed so as to be connectable to a vehicle structure (not shown) of the motorcycle. The connection of the second end 12b of the holding arm 12 to the vehicle structure can be rigid or also articulated.

For this purpose, the holding arm 12 comprises, merely by way of example, a cylindrical holding portion 12c, which can be guided as a pin for insertion or provided with a thread for screwing into a receptacle (not shown) which is correspondingly provided on the vehicle side of the vehicle structure.

As described, the adjustment device 13 makes the mirror mounting 11 adjustable relative to the holding arm 12. For this purpose, the adjustment device 13 is rotatable (rotational adjustment D) at least about the free axis of rotation 14. It is understood that the adjustment device 13 can also have other, additional degrees of freedom.

In order to limit a range of motion of the rotational adjustment D about the free axis of rotation 14, the adjustment device 13 comprises the above-mentioned limiting device 15. The device 15 is thus designed to limit a rotation of the mirror mounting 11 relative to the holding arm 12 beyond a defined range of motion.

The rear mirror assembly 10 shown is in the form of an electrified rear mirror assembly and has an electrical line 17 which extends inside the holding arm 12 into the mirror mounting 11. The assembly can be provided for example to power and/or supply electrical signals to electrical components 18 (such as a lighting element and/or an indicator and/or a heating element) which are assigned to the mirror mounting 11 and/or the mirror glass 16. By way of example, a lighting element 18 of a blind spot warning system is shown. Of course, instead of the one electrical line 17, it is also possible for a plurality of electrical lines to be provided in the same way. As shown in FIG. 1, the electrical line 17 extends in the interior through the adjustment device 13.

Figure 2:
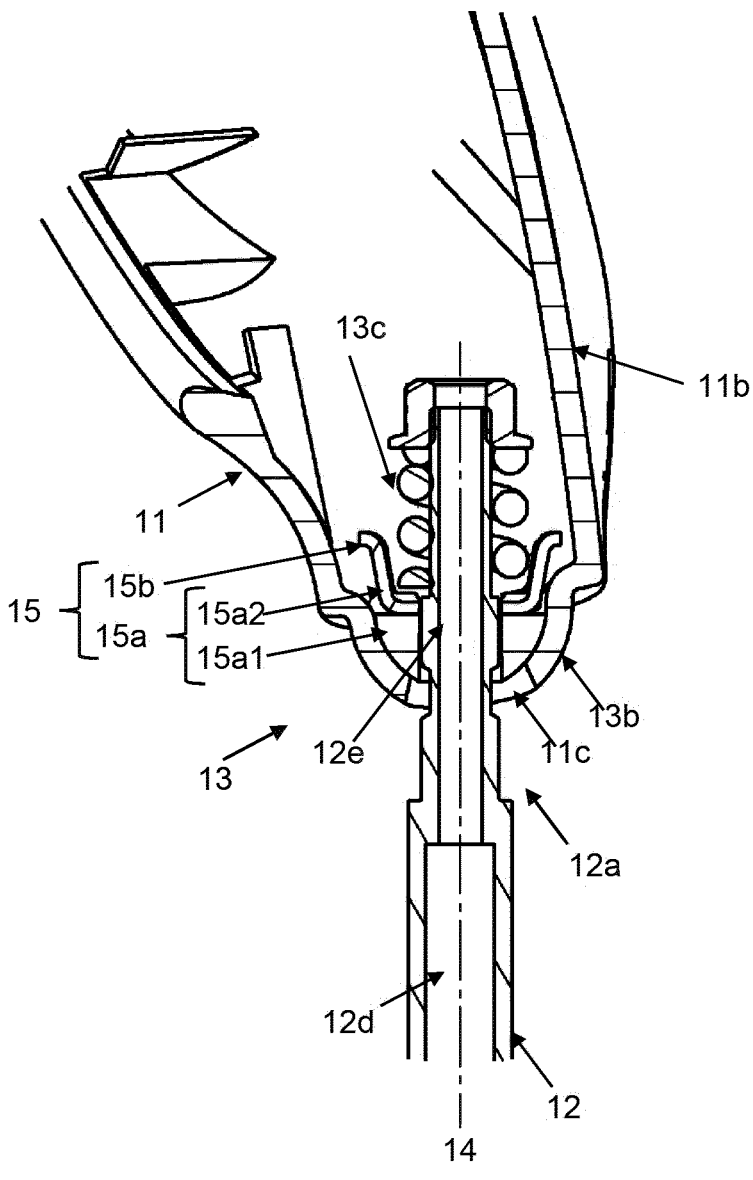
FIG. 2 is a detail view of an adjustment device of the rear mirror assembly according to FIG. 1.

In the detail view of the adjustment device 13 according to FIG. 2, the electrical line 17 is hidden for the sake of greater clarity, and therefore a corresponding pipe shape of the holding arm 12 with a cavity 12d extending along the length thereof can be seen, which is provided to receive the electrical line 17.

In the embodiment shown, the adjustment device 13 comprises a ball joint having a ball socket 13a and a ball head 13b guided in the ball socket 13a, wherein the ball head 13b is assigned to the mirror mounting 11, and the ball socket 13a is assigned to the holding arm 12.

The ball joint makes it possible to easily adjust the mirror mounting 11 in the position thereof relative to the holding arm 12, rotation about the free axis of rotation 14 formed by the ball joint being made possible. In addition, the design as a ball joint allows lateral tilting (with respect to the axis of rotation 14) so that the ball head 13*b* and thus the mirror mounting 11 can be tilted laterally relative to the holding arm 12.

According to the embodiment shown, the ball head 13*b* is formed by the housing wall 11*b* of the mirror mounting 11, and is thus an integral component of the mirror housing of the mirror mounting 11.

The limiting device 15 is arranged on a side of the ball head 13*b* facing away from the ball socket 13*a*, that is to say inside the ball head 13*b* or inside the housing wall 11*b* of the mirror mounting 11.

Figure 3:
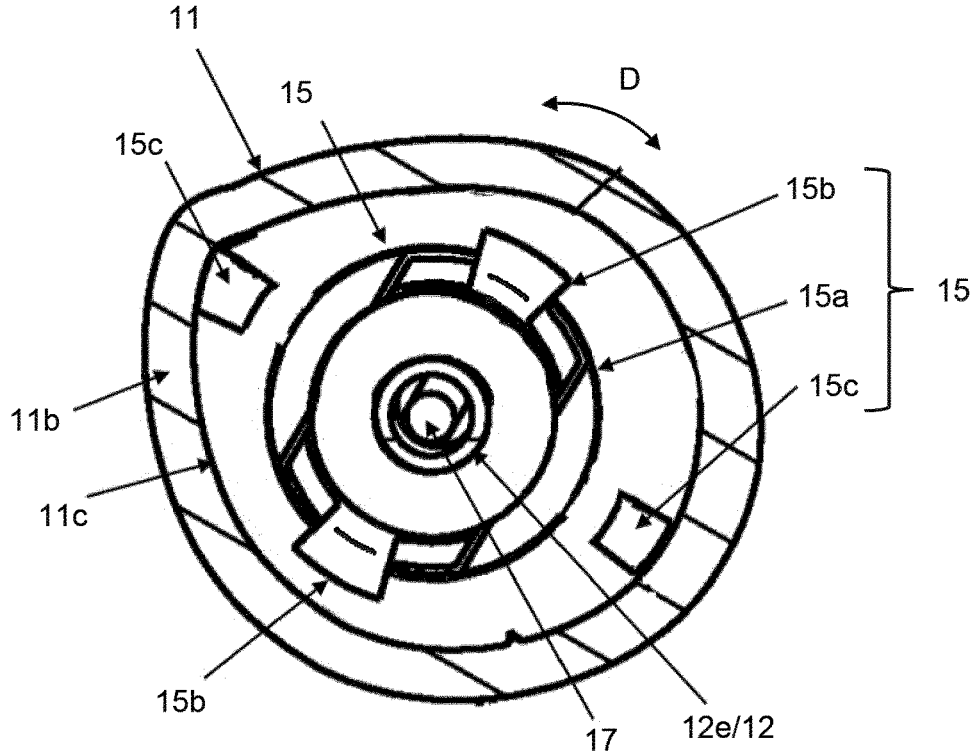
FIG. 3 is a sectional view of the adjustment device according to FIG. 2.

As can be seen from FIGS. 2 and 3, the limiting device 15 comprises a blocking element 15*a* having two extensions 15*b*, which is provided to act on two stops 15*c* of the limiting device 15 in two defined end positions of the rotational adjustment D. In the embodiment shown, the two stops 15*c* are assigned to the mirror mounting 11 and are correspondingly arranged on an inner face 11*c* of the housing wall 11*b*.

The blocking element 15*a* is coupled in a rotationally fixed manner to the ball socket 13*a* so that a rotational adjustment D of the mirror mounting 11 leads to a rotation of the housing wall 11*b* and thus of the two stops 15*c* relative to the blocking element 15*a*. If one or both stops 15*c* reach the respective extension 15*b* of the blocking element 15*a*, then any additional rotational adjustment D going further in this direction of rotation is blocked by the extension 15*b*. The respective stop 15*c* thus limits freedom of movement to such an extent that the mirror mounting 11 can be rotated only by a predetermined angle (in this case up to approx. 180°). In this way, overwinding of the electrical line located inside is prevented. It is understood that, instead of the two stops 15*c* and the arrangement thereof offset by 180°, it is also possible for only one stop or more than two stops to be provided, and/or for the (angular) distance thereof relative to one another to be selected according to requirements. The same applies to the number and position of the extensions 15*b* of the blocking element 15*a*. It is also possible for only one extension or more than two extensions to be provided, and/or for the (angular) distance thereof relative to one another to be selected according to requirements.

As can be seen from FIG. 2, the blocking element 15*a* is arranged on a first side of the housing wall 11*b*, and the ball socket 13*a* is arranged on a second side arranged opposite the first side so that the housing wall 11*b* forming the ball head 13*b* is positioned between the ball socket 13*a* and the blocking element 15*a*.

The blocking element 15*a* is arranged in a rotationally fixed manner relative to the ball socket 13*a* for example by an end portion 12*e* of the holding arm 12 which is arranged at the first end 12*a* and extends through a correspondingly dimensioned recess 11*c* of the ball head 13*b*, and to which end portion the blocking element 15*a* is attached in a rotationally fixed manner. The recess 11*c* is adapted in such a way that, when adjusting the mirror mounting 11, the housing wall 11*b* can still be moved together with the ball head 13*b* relative to the ball socket 13*a* and the blocking element 15*a*.

Furthermore, the adjustment device 13 comprises a spring element 13*c* in the form of a helical spring 13*c* for axially preloading the adjustment device 13, the spring element 13*c* preloading the blocking element 15*a* with a spring tension toward the ball head 13*b* and the ball socket 13*a*. For this purpose, the spring tension is oriented in a direction coaxial with the end portion 12*e* and with the free axis of rotation 14.

As can be seen in particular from FIG. 2, according to a first embodiment, the blocking element 15*a* can comprise two elements 15*a*1, 15*a*2: a universal ball joint 15*a*1, the spherical surface of which is in planar contact with the inner surface 11*c* of the housing wall 11*b* in the region of the ball head 13*b* even during a rotation and/or tilting of the mirror mounting 11. The two extensions 15*b* are formed on a separate disc-shaped element 15*a*2.

Figure 4:
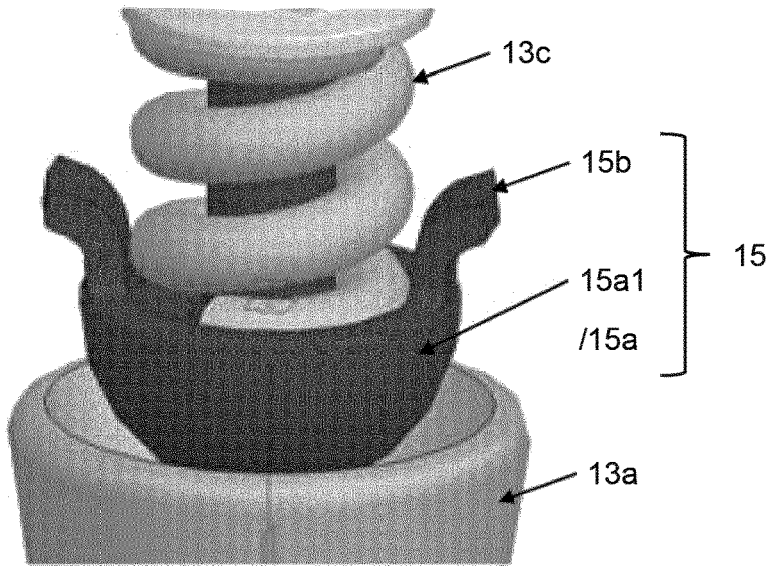
FIG. 4 is a perspective partial view of a blocking element of the adjustment device according to FIG. 3.

FIG. 4 shows an alternative, second embodiment of the blocking element 15*a*, in which the blocking element 15*a* is formed as a single piece. In this case, the two extensions 15*b* are integrally formed on the universal ball joint 15*a*1 as a single piece and from the same material. The blocking element 15*a* can be used in the first embodiment (according to FIG. 1 to 3) of the rear mirror assembly 10 without the need for further changes and can replace the two-part blocking element 15*a* in this embodiment.

The invention claimed is:

1. A rear mirror assembly for a motorcycle, the rear mirror assembly comprising:
   a mirror mounting;
   a holding arm which is configured to connect the mirror mounting to the motorcycle;
   an adjustment device arranged between the holding arm and the mirror mounting, the adjustment device being configured to be rotatable at least about one free axis of rotation in order to adjust a position of the mirror mounting relative to the holding arm; and
   at least one electrical line which extends from the holding arm through the adjustment device to the mirror mounting,
   wherein the adjustment device has a limiting device in order to limit a rotational adjustment,
   wherein at least a portion of the at least one electrical line extends along the free axis of rotation, and
   wherein the limiting device comprises a blocking element having at least one extension which is provided to act on at least one stop of the limiting device in each end position of the rotational adjustment.

2. The rear mirror assembly according to claim 1, wherein the adjustment device comprises a ball joint having a ball socket and a ball head guided in the ball socket.

3. The rear mirror assembly according to claim 2, wherein the ball head is assigned to the mirror mounting, and the ball socket is assigned to the holding arm.

4. The rear mirror assembly according to claim 2, wherein the ball head is formed by a housing wall of the mirror mounting.

5. The rear mirror assembly according to claim 4, wherein the limiting device is arranged on a side of the housing wall facing away from the ball socket.

6. The rear mirror assembly according to claim 1, wherein the adjustment device comprises a spring element for axially preloading the adjustment device, the spring element acting on the blocking element with a spring tension toward the ball head and the ball socket.

7. The rear mirror assembly according to claim 1, wherein the adjustment device is configured to tilt the mirror mounting relative to the holding arm.

8. A motorcycle comprising the rear mirror assembly according to claim 1, wherein the rear mirror assembly is connected to a structure of the motorcycle.

9. A rear mirror assembly for a motorcycle, the rear mirror assembly comprising:
   a mirror mounting;
   a holding arm which is configured to connect the mirror mounting to the motorcycle;

an adjustment device arranged between the holding arm and the mirror mounting, the adjustment device being configured to be rotatable at least about one free axis of rotation in order to adjust a position of the mirror mounting relative to the holding arm; and at least one electrical line which extends from the holding arm through the adjustment device to the mirror mounting, wherein the adjustment device has a limiting device in order to limit a rotational adjustment, wherein at least a portion of the at least one electrical line extends along the free axis of rotation, wherein the adjustment device comprises a ball joint having a ball socket and a ball head guided in the ball socket, wherein the ball head is formed by a housing wall of the mirror mounting, and wherein the limiting device is arranged on a side of the housing wall facing away from the ball socket.

10. The rear mirror assembly according to claim 9, wherein the ball head is assigned to the mirror mounting, and the ball socket is assigned to the holding arm.

11. The rear mirror assembly according to claim 9, wherein the adjustment device is configured to tilt the mirror mounting relative to the holding arm.

12. A motorcycle comprising the rear mirror assembly according to claim 9, wherein the rear mirror assembly is connected to a structure of the motorcycle.

* * * * *